United States Patent [19]

Matsuno

[11] Patent Number: 4,522,114
[45] Date of Patent: Jun. 11, 1985

[54] AIR DUCT ASSEMBLY

[75] Inventor: Yoshio Matsuno, Sagamihara, Japan

[73] Assignee: Nissan Motor Company, Limited, Yokohama, Japan

[21] Appl. No.: 474,823

[22] Filed: Mar. 10, 1983

[30] Foreign Application Priority Data

Apr. 12, 1982 [JP] Japan .................. 57-59703

[51] Int. Cl.³ .................. F16L 11/12; F16L 55/00
[52] U.S. Cl. .................. 98/2.09; 138/103; 138/178; 174/47
[58] Field of Search ........... 138/103, 108, 172, 174, 138/178; 174/47, 98; 98/2.09, 2.205, 2.08

[56] References Cited

U.S. PATENT DOCUMENTS 2,550,021 4/1951 Rappl .................. 138/103 X
3,367,370 2/1968 Sherlock .................. 138/103 X
3,961,647 6/1976 Doubleday .................. 138/103

FOREIGN PATENT DOCUMENTS 323095 7/1957 Switzerland .................. 174/47

Primary Examiner—James E. Bryant, III
Attorney, Agent, or Firm—Schwartz, Jeffery, Schwaab, Mack, Blumenthal & Evans

[57] ABSTRACT

In an air duct assembly, the air duct is integrally provided with a harness sheath which is formed with a laterally openable, longitudinal slit adapted to permit the harness to be inserted in the sheath and retained therein. The harness sheath may be molded, integrally with the air duct, of a polyethylene resin by blow-molding, for example. The air duct is a defroster duct which extends transversely across the passenger comparment of an automobile.

1 Claim, 4 Drawing Figures

PASSENGER COMPARTMENT

AIR DUCT ASSEMBLY

BACKGROUND OF THE INVENTION

1. Field of the Invention

This invention relates to an air duct assembly having a harness sheath provided integrally therewith.

2. Description of the Prior Art

In order to have a better understanding of the present invention, reference will first be made to FIGS. 1 and 2 of the accompanying drawings, which illustrate a conventional harness mounting structure of an automotive air duct assembly, wherein in the case where, for example, a harness 1 is introduced from an engine room E into a vehicle compartment R through a dash floor panel 2 to be wired to a fuse box 3 as shown in FIG. 1, the harness 1 is retained at intermediate points by means of grip members 5 welded or otherwise secured to a dash upper panel 4. Indicated at 1a, 6 and 9 are branch connectors, a windshield, and a cowl top panel, respectively.

However, the foregoing conventional harness mounting structure has the following disadvantages: Being point-supported by means of the grip members 5, the harness 1 tends to flex between the grip members 5 so that each time the vehicle body vibrates, the flexed portions of the harness 1 are caused to swing to be rubbed against a dash insulator 8, duct 9 and/or other components provided adjacent thereto and thus the insulator tape of the harness 1 is finally broken, which is very likely to cause a fire. Obviously, this raises the problem of disaster prevention. Another disadvantage is such that the efficiency of harness wiring operation is low due to the fact that the steps of bending the plate-like grip members 5 to embrace the harness 1 are involved in an attempt to mount the harness 1 in position.

SUMMARY OF THE INVENTION

It is an object of the present invention to provide an air duct assembly provided with a novel and improved harness mounting structure which is so designed as to obviate the aforementioned disadvantages of the prior-art structure.

Briefly, according to the present invention, the air duct assembly is provided, by means of molding, with a harness sheath which is formed with a laterally openable, longitudinal slit adapted to permit the harness to be inserted in the sheath and retained therein. The air duct is a defroster duct which extends transversely across the passenger compartment of an automobile.

Other objects, features and advantages of the present invention will become apparent from the ensuing description taken in conjunction with the accompanying drawings.

DESCRIPTION OF THE PREFERRED EMBODIMENTS

Figure 1:
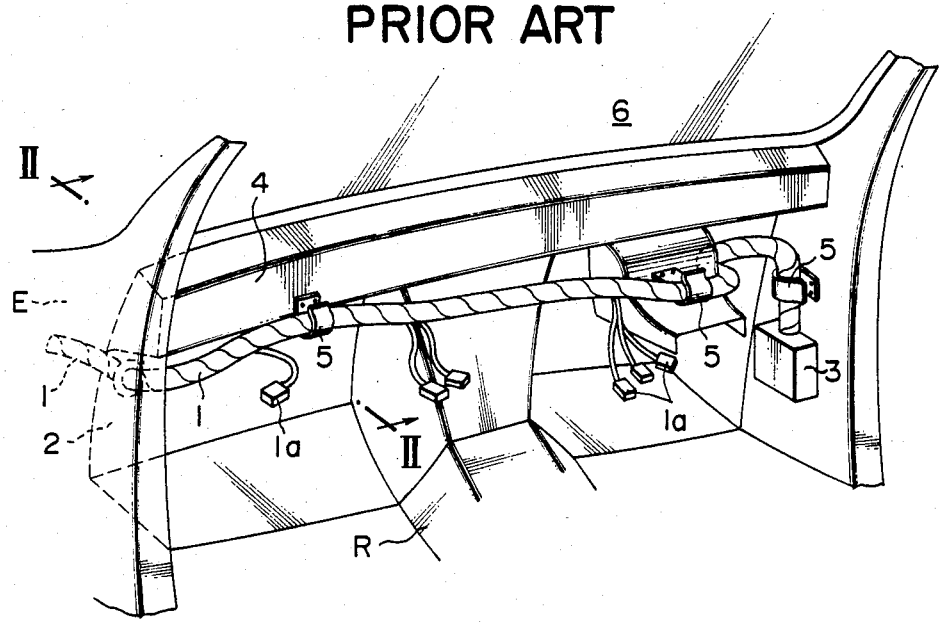
FIG. 1 is a fragmentary perspective view showing a conventional harness mounting structure of an automotive air duct assembly.
Figure 2:
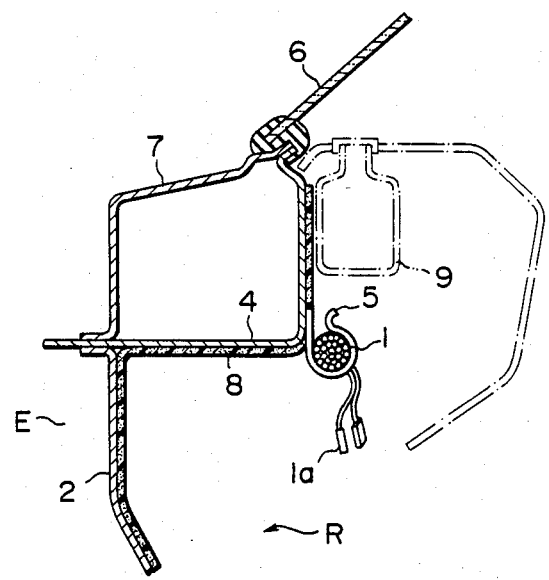
FIG. 2 is a sectional view taken along the lines II—II of FIG. 1.
Figure 3:
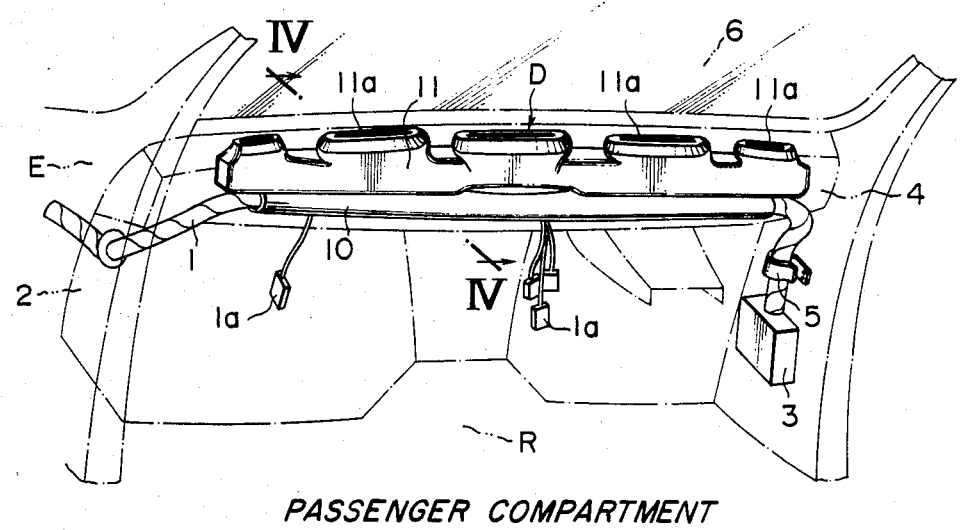
FIG. 3 is a fragmentary perspective view showing the air duct assembly according to an embodiment of the present invention.
Figure 4:
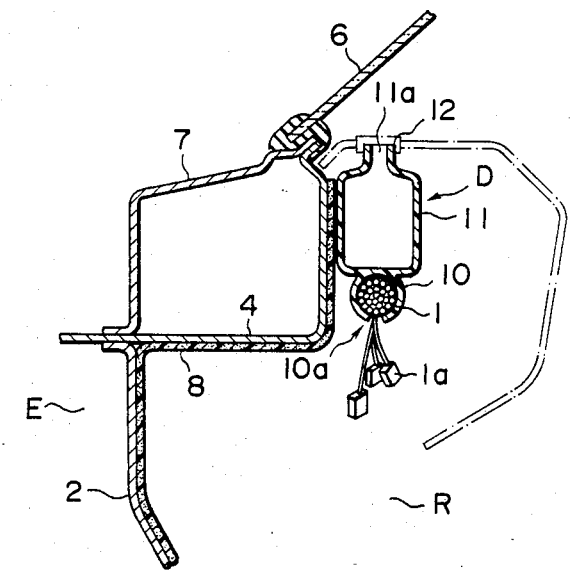
FIG. 4 is a sectional view taken along the lines IV—IV of FIG. 4.

Referring to FIGS. 3 and 4, there is shown the air duct assembly according to an embodiment of the present invention, wherein parts similar to those of FIGS. 1 and 2 are indicated by like reference numerals, and further description thereof will be omitted.

As will be appreciated, the air duct assembly, indicated generally at D, of the present invention is characterized in that the air duct body 11, or defroster duct 11 is integrally provided, by means of molding, with a harness sheath 10 having a laterally openable, longitudinal slit 10a formed in the wall thereof.

The harness sheath 10 is formed of a plastic material such as, for example, polyethylene resin or the like, integrally with the defroster duct 11, by means of blow-molding. In the illustrated embodiment, the harness sheath 10 is provided at the bottom of the defroster duct 11.

The harness sheath 10 is laterally openable at the slit 10a, as mentioned above, so that the harness 1 can be forced into the sheath 10 through the thus opened slit, and thereafter, the sheath 10 can return, by virtue of its own elasticity, to the original configuration. Indicated at 11a and 12 are a defroster nozzle and a grille therefor, respectively.

In harness mounting operation, in the case where the harness 1 is introduced from the engine room E into the vehicle passenger compartment R through the dash floor panel 2, the harness 1 is placed in substantially aligned contact with the slit 10a of the sheath 10 and then forced into the sheath through the slit 10a. By so doing, the wall of the sheath 10 is flexed so that the slit 10a thereof is laterally opened, thus permitting the harness 1 to be inserted therein.

Upon insertion, the harness 1 turns out wrapped up, over its entire length, in the sheath; thus, the sheath 10 serves to protect the harness 1 from the components provided adjacent thereto.

As will be appreciated from the foregoing explanation, according to the present invention, the air duct body, such as a defroster duct or the like, is provided with a plastic harness sheath which is formed integrally therewith by means of molding, the sheath being formed with a laterally openable, longitudinal slit through which the harness can be inserted in the sheath, and with such an arrangement, the following effects and advantages can be attained:

The harness sheath serves as a protector for the harness as mentioned above; thus, even if vibrations of the vehicle body cause the sheath to be swung into contact with the neighboring components, the harness per se can be protected from direct contact with such components. Needless to say, it is possible to avoid such a situation that the harness is swung into striking contact with the dash insulator and so forth. In this way, the possibility can completely be precluded that a fire breaks out due to breakage of the insulator coating of the harness. Thus, the problem of disaster prevention with the aforementioned prior-art arrangement can most effectively be eliminated.

Furthermore, the wiring of the harness can be carried out simply be forcing the harness in the sheath through the slit formed in the sheath, so that the wiring operation can be performed with enhanced efficiency.

Still furthermore, the harness mounting structure according to the present invention is advantageous in terms of cost over the aforementioned prior-art one in that the harness sheath can be molded, integrally with the air duct body, of a plastic material such as polyethylene resin or the like, by means of blow-molding.

While the present invention has been illustrated and described with respect to a specific embodiment thereof, it is to be understood that the present invention is by no means limited thereto but covers all changes and modifications which will become possible within the scope of the appended claims.

What is claimed is:

1. In an automobile having a passenger compartment, an air duct assembly, comprising:
   a harness;
   a defroster duct molded of a plastic material, said defroster duct being disposed at a forward part of said passenger compartment, extending transversely across said automobile, and having a bottom; and
   a harness sheath provided at said bottom of said defroster duct, said harness sheath being molded of said plastic material integrally with said defroster duct and having a wall formed with a laterally openable, longitudinal slit, said harness sheath being sufficiently flexible such that when said harness is placed in substantially aligned contact with said slit and is forced into said sheath through said slit, said wall of the sheath is flexed such that said slit is laterally opened to permit the harness to pass through said slit into said sheath, and the harness being received in said sheath, is covered over a substantial length by said sheath so that said sheath serves as a protector for the harness to prevent the harness from coming into contact with neighboring components when the body of the motor vehicle vibrates, thereby preventing the possibility of fire due to breakage of an insulator coating of said harness.

* * * * *